US012391904B2

(12) United States Patent
Tollkoetter et al.

(10) Patent No.: US 12,391,904 B2
(45) Date of Patent: Aug. 19, 2025

(54) METHOD FOR PREPARING A PARTICLE- AND SURFACTANT-CONTAINING LIQUID

(71) Applicant: Henkel AG & Co. KGaA, Duesseldorf (DE)

(72) Inventors: Alexander Tollkoetter, Hilden (DE); Volker Blank, Leverkusen (DE); Gerd Boesemann, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 509 days.

(21) Appl. No.: 17/351,587

(22) Filed: Jun. 18, 2021

(65) Prior Publication Data

US 2021/0309946 A1 Oct. 7, 2021

Related U.S. Application Data

(63) Continuation of application No. PCT/EP2019/085025, filed on Dec. 13, 2019.

(30) Foreign Application Priority Data

Dec. 18, 2018 (DE) ........................ 102018222190.1

(51) Int. Cl.

| | |
|---|---|
| ***C11D 1/00*** | (2006.01) |
| ***C11D 3/50*** | (2006.01) |
| ***C11D 11/00*** | (2006.01) |
| ***C11D 17/00*** | (2006.01) |
| ***C11D 17/08*** | (2006.01) |

(52) U.S. Cl.

CPC .......... *C11D 17/0013* (2013.01); *C11D 3/505* (2013.01); *C11D 11/0094* (2013.01)

(58) Field of Classification Search

CPC ........... C11D 1/00; C11D 3/505; C11D 11/00; C11D 11/0064; C11D 11/0094; C11D 17/0013; C11D 17/08

See application file for complete search history.

(56) References Cited

U.S. PATENT DOCUMENTS

| | | | | |
|---|---|---|---|---|
| 11,680,225 B2 * | 6/2023 | Meier | C11D 1/83 510/340 |
| 2017/0267954 A1 * | 9/2017 | Bellomi | C11D 1/29 |
| 2018/0112157 A1 * | 4/2018 | Bellomi | C11D 11/0094 |

FOREIGN PATENT DOCUMENTS

| | | | |
|---|---|---|---|
| DE | 102005018243 | A1 | 10/2006 |
| DE | 102014225145 | A1 | 6/2016 |
| WO | 2011120772 | A1 | 10/2011 |

OTHER PUBLICATIONS

PCT International Search Report PCT/EP2019/085025 Mailing Date: Mar. 19, 2020; Completed: Mar. 27, 2020 2 pages.

* cited by examiner

*Primary Examiner* — Brian P Mruk

(74) *Attorney, Agent, or Firm* — Bojuan Deng

(57) ABSTRACT

A method including: a) providing a solvent-surfactant mixture; b) continuously passing the solvent-surfactant mixture through a main line; c) adjusting the yield point of the solvent-surfactant mixture in the main line to 0.1 to 10 Pa; d) continuously introducing particles having a diameter of 0.1 to 3 mm in the form of a carrier liquid-particle dispersion into the main line via a secondary line; e) continuously discharging the particle-containing solvent-surfactant mixture from the main line.

19 Claims, No Drawings

METHOD FOR PREPARING A PARTICLE- AND SURFACTANT-CONTAINING LIQUID

FIELD OF THE INVENTION

The present application relates to a method for preparing a particle- and surfactant-containing liquid, in particular a continuous or discontinuous method for preparing a particle- and surfactant-containing liquid cleaning agent.

BACKGROUND OF THE INVENTION

Surfactant-containing liquids, such as liquid washing or cleaning agents, are generally prepared by mixing the liquid carrier with the washing- or cleaning-active active substances. Mixing and stirring surfactant-containing liquids usually results in air being introduced into the liquid or in the liquid being foamed. The introduced gas or the formed foam can adversely effect the usage properties or the aesthetics of the liquid product. Depending on the other properties of the liquid, these adverse effects are not lessened even under the conditions of subsequent storage. For example, liquids having a correspondingly high yield point are only degassed very slowly or not at all.

If particles are also intended to be incorporated into a surfactant-containing liquid, further technical challenges arise with regard to the product aesthetics and the product properties. If the particle- and surfactant-containing liquid is mixed with too low an amount of energy, this leads to an inhomogeneous particle distribution, whereas the particles are damaged if the energy input is too high, due to the mechanical stress that occurs.

In order to solve the technical problems described above, in particular in order to prepare particle- and surfactant-containing liquids having a homogeneous particle distribution, German patent application DE 10 2005 018 243 A1 discloses a continuous method in which particles are added to a surfactant-containing liquid only shortly before said liquid is ultimately poured into a packaging unit.

BRIEF SUMMARY OF THE INVENTION

The object of the application was to provide an improved method for preparing particle- and surfactant-containing liquids, in particular particle-containing washing and cleaning agents, by comparison with the prior art, which method is suitable for minimizing the amount of gas introduced and the foaming of the liquid during preparation, for limiting the mechanical stress on the particles to a harmless level, and for ensuring a homogeneous distribution of the particles in the surfactant-containing liquid.

This object was achieved by a method having the following substeps:

a) providing a solvent-surfactant mixture;
b) continuously introducing the solvent-surfactant mixture into a main line;
c) adjusting the yield point of the solvent-surfactant mixture in the main line to 0.1 to 10 Pa;
d) continuously introducing particles having a diameter of 0.1 to 3 mm in the form of a carrier liquid-particle dispersion into the main line via a secondary line;
e) continuously discharging the particle-containing solvent-surfactant mixture from the main line.

In the first step of the method, a solvent-surfactant mixture is provided. Aqueous and aqueous-organic solvent systems are particularly suitable as solvents. If aqueous-organic solvent systems are used, the solvent system comprises at least 60 wt. %, preferably at least 80 wt. % and in particular at least 90 wt. % water.

Regardless of whether the solvent-surfactant mixture provided in step a) comprises an aqueous or an aqueous-organic solvent system, this solvent-surfactant mixture comprises, based on its total weight, preferably 60 to 95 wt. %, more preferably 70 to 92 wt. % and in particular 75 to 90 wt. % solvent, preferably water.

Particularly preferred organic solvents originate from the group of ethanol, n-propanol, i-propanol, butanols, glycol, propanediol, butanediol, methylpropanediol, glycerol, propylene carbonate, diglycol, propyl diglycol, butyl diglycol, hexylene glycol, diethylene glycol ethyl ether, diethylene glycol methyl ether, diethylene glycol-n-butyl ether, diethylene glycol hexyl ether, diethylene glycol-n-butyl ether acetate, ethylene glycol propyl ether, ethylene glycol-n-butyl ether, ethylene glycol hexyl ether, ethylene glycol-n-butyl ether acetate, triethylene glycol, triethylene glycol methyl ether, triethylene glycol ethyl ether, triethylene glycol-n-butyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol-n-propyl ether, dipropylene glycol-n-propyl ether, propylene glycol-n-butyl ether, dipropylene glycol-n-butyl ether, tripropylene glycol-n-butyl ether, propylene glycol phenyl ether, propylene glycol diacetate, dipropylene glycol dimethyl ether, methoxytriglycol, ethoxytriglycol, butoxytriglycol, 1-butoxyethoxy-2-propanol, 3-methyl-3-methoxybutanol, propylene-glycol-t-butyl ether and di-n-octylether, preferably from the group of glycerol and propylene glycol.

In addition to the solvent, the mixture provided in step a) also contains at least one surfactant. The surfactant content of the solvent-surfactant mixture is, based on the total weight thereof, preferably 5 to 35 wt. %, more preferably 8 to 30 wt. % and in particular 10 to 25 wt. %.

Any surfactants can be used in principle. In terms of the success of the method and the later field of application of the particle- and surfactant-containing liquid, cationic, amphoteric and anionic surfactants are preferred. The use of surfactants from the group of anionic and/or amphoteric surfactants is particularly preferred.

DETAILED DESCRIPTION OF THE INVENTION

The solvent-surfactant mixture particularly preferably comprises an anionic surfactant and an amphoteric surfactant, very particularly preferably at least one anionic surfactant, at least one amphoteric surfactant and at least one nonionic surfactant.

Anionic surfactants may be aliphatic sulfates such as fatty alcohol sulfates, fatty alcohol ether sulfates, dialkyl ether sulfates, monoglyceride sulfates and aliphatic sulfonates such as alkane sulfonates, olefin sulfonates, ether sulfonates, n-alkyl ether sulfonates, ester sulfonates and lignosulfonates. Also usable are alkylbenzene sulfonates, fatty acid cyanamides, sulfosuccinic acid esters, fatty acid isothionates, acyl amino alkane sulfonates (fatty acid taurides), fatty acid sarcosinates, ether carboxylic acids and alkyl (ether) phosphates.

Alkyl ether sulfates (fatty alcohol ether sulfates, INCI Alkyl Ether Sulfates) are products of sulfation reactions on alkoxylated alcohols. A person skilled in the art generally understands alkoxylated alcohols to be the reaction products of alkylene oxide, preferably ethylene oxide, with alcohols, preferably with longer-chain alcohols, i.e. with aliphatic straight-chain or mono- or multi-branched, acyclic or cyclic, saturated or mono- or polyunsaturated, preferably straight-chain, acyclic, saturated alcohols having 6 to 22, preferably 8 to 18, in particular 10 to 16 and particularly preferably 12 to 14 carbon atoms. In general, n mol ethylene oxide and one mol alcohol results, depending on the reaction conditions, in a complex mixture of addition products having different degrees of ethoxylation (n=1 to 30, preferably 0.30 to 20, in particular 0.30 to 10, particularly preferably 0.30 to 5). A further embodiment of the alkoxylation consists in using mixtures of the alkylene oxides, preferably the mixture of ethylene oxide and propylene oxide. Low-ethoxylated fatty alcohols having 0.30 to 4 ethylene oxide units (EO), in particular 0.30 to 2 EO, for example 0.50 EO, 1.0 EO, 1.3 EO and/or 2.0 EO such as Na—$C_{12-14}$ fatty alcohol+0.5 EO sulfate, Na—$C_{12-44}$ fatty alcohol+1.3 EO sulfate, Na—$C_{12-14}$ fatty alcohol+2.0 EO sulfate and/or Mg—$C_{11-14}$ fatty alcohol+1.0 EO sulfate are more particularly preferred.

A preferred solvent-surfactant mixture comprises one or more alkyl ether sulfates in an amount of 1 to 40 wt. %, preferably 6 to 26 wt. % and in particular 8 to 20 wt. %.

The amphoteric surfactants (zwitterionic surfactants) which can be used according to the invention include betaines, alkylamido alkylamines, alkyl-substituted amino acids, acylated amino acids or biosurfactants, of which the betaines are preferred in the context of the teaching according to the invention.

A preferred solvent-surfactant mixture comprises one or more amphoteric surfactants in an amount of 0.1 to 20 wt. %, preferably 2 to 12 wt. % and in particular 3 to 10 wt. %.

The agent according to the invention can additionally contain one or more nonionic surfactants, usually in an amount of 0.01 to 6 wt. %, preferably 0.1 to 5 wt. % and in particular 0.5 to 4 wt. %.

Nonionic surfactants may be alkoxylates, such as polyglycol ethers, fatty alcohol polyglycol ethers, alkylphenol polyglycol ethers, end-capped polyglycol ethers, mixed ethers and hydroxy mixed ethers and fatty acid polyglycol esters. Ethylene oxide/propylene oxide block polymers, fatty acid alkanolamides and fatty acid polyglycol ethers can also be used. Important classes of nonionic surfactants that can be used according to the invention are also amine oxides.

Fatty alcohol polyglycol ethers are to be understood according to the invention to mean unbranched or branched, saturated or unsaturated $C_{10-22}$ alcohols alkoxylated with ethylene oxide (EO) and/or propylene oxide (PO) with a degree of alkoxylation of up to 30, preferably ethoxylated $C_{10-18}$ fatty alcohols with a degree of ethoxylation of less than 30, preferably with a degree of ethoxylation of 1 to 20, in particular 1 to 12, particularly preferably 1 to 8, extremely preferably 2 to 5, for example $C_{12-14}$ fatty alcohol ethoxylates with 2, 3 or 4 EO or a mixture of the $C_{12-14}$ fatty alcohol ethoxylates with 3 and 4 EO in a ratio by weight of 1:1 or isotridecyl alcohol ethoxylate with 5, 8 or 12 EO.

Amine oxides that are suitable according to the invention include alkyl amine oxides, in particular alkyl dimethyl amine oxides, alkyl amido amine oxides, and alkoxy alkyl amine oxides. Preferred amine oxides satisfy formula (I) or (Ib), $$R^6R^7R^8N^+—O^- \quad \text{(Ia)}$$

$$R^6—[CO—NH—(CH_2)_w]_z—N^+(R^7)(R^8)—O^- \quad \text{(Ib)}$$

in which $R^6$ is a saturated or unsaturated $C_{6-22}$ alkyl group, preferably a $C_{8-18}$ alkyl group, in particular a saturated $C_{10-16}$ alkyl group, for example a saturated $C_{12-14}$ alkyl group, which is bound to the nitrogen atom N in the alkyl amido amine oxides via a carbonyl amido alkylene group —CO—NH—$(CH_2)_z$— and in the alkoxy alkyl amine oxides via an oxaalkylene group —O—$(CH_2)_z$—, where z in each case stands for a number from 1 to 10, preferably 2 to 5, in particular 3, $R^7$ and $R^8$ are, independently of one another, a $C_{1-4}$ alkyl group, which is optionally hydroxy-substituted, such as a hydroxyethyl group, in particular a methyl group.

Examples of suitable amine oxides are the following compounds as named in accordance with the INCI: Almond amidopropylamine Oxide, Babassuamidopropylamine Oxide, Behenamine Oxide, Cocamidopropyl Amine Oxide, Cocamidopropylamine Oxide, Cocamine Oxide, Coco-Morpholine Oxide, Decylamine Oxide, Decyltetradecylamine Oxide, Diaminopyrimidine Oxide, Dihydroxyethyl $C_{8-10}$ Alkoxypropylamine Oxide, Dihydroxyethyl $C_{9-11}$ Alkoxypropylamine Oxide, Dihydroxyethyl $C_{12-15}$ Alkoxypropylamine Oxide, Dihydroxyethyl Cocamine Oxide, Dihydroxyethyl Lauramine Oxide, Dihydroxyethyl Stearamine Oxide, Dihydroxyethyl Tallowamine Oxide, Hydrogenated Palm Kernel Amine Oxide, Hydrogenated Tallowamine Oxide, Hydroxyethyl Hydroxypropyl $C_{12-15}$ Alkoxypropylamine Oxide, Isostearamidopropylamine Oxide, Isostearamidopropyl Morpholine Oxide, Lauramidopropylamine Oxide, Lauramine Oxide, Methyl Morpholine Oxide, Milkamidopropyl Amine Oxide, Minkamidopropylamine Oxide, Myristamidopropylamine Oxide, Myristamine Oxide, Myristyl/Cetyl Amine Oxide, Oleamidopropylamine Oxide, Oleamine Oxide, Olivamidopropylamine Oxide, Palmitamidopropylamine Oxide, Palmitamine Oxide, PEG-3 Lauramine Oxide, Potassium Dihydroxyethyl Cocamine Oxide Phosphate, Potassium Trisphosphonomethylamine Oxide, Sesamidopropylamine Oxide, Soyamidopropylamine Oxide, Stearamidopropylamine Oxide, Stearamine Oxide, Tallowamidopropylamine Oxide, Tallowamine Oxide, Undecylenamidopropylamine Oxide und Wheat Germamidopropylamine Oxide. A preferred amine oxide is for example Cocamidopropylamine Oxide.

The solvent-surfactant mixture particularly preferably comprises salts of alkyl ether sulfates, alkyl betaines and alkyl amine oxides.

The solvent-surfactant mixture can be provided continuously or discontinuously.

If the solvent-surfactant mixture is introduced into the main line from a container, for example, this solvent-surfactant mixture can be produced in this container by mixing the solvent and surfactant or can be supplied to the container from another container as a finished mixture (master batch).

Alternatively, it is also possible to introduce a pre-prepared solvent-surfactant mixture (master batch) into the container and then modify said mixture by adding a further solvent and/or further surfactant.

The use of a master batch provides for efficient preparation of product variants on the basis of a single starting formulation as a result of the original mixture being modified in this case at the end of the process.

In a first variant of the method, the solvent-surfactant mixture is provided discontinuously in a buffer container and then introduced continuously into the main line from a buffer container.

In an alternative variant of the method, the solvent-surfactant mixture is produced continuously, preferably by introducing surfactant into a solvent flow in the main line.

The solvent-surfactant mixture is preferably transparent. "Transparency" is understood to mean a turbidity value of the solvent-surfactant mixture of a maximum of 150 NTU, more preferably of a maximum of 100 NTU and in particular of a maximum of 50 NTU. The transparency of a composition can be determined by known methods using its turbidity, the determined NTU value (nephelometric turbidity unit) indicating the degree of turbidity. A transparency of the liquid of 5 to 50 NTU, in particular 10 to 25 NTU, is preferred. Turbidity measurements can be carried out using a turbidimeter (for example from Hach) at 20° C. to 25° C.

The solvent-surfactant mixture preferably has an air content of 0.1 to 10 vol. %, more preferably 0.15 to 5 vol. % and in particular 0.2 to 3 vol. %.

In addition to the solvent and the surfactant, the solvent-surfactant mixture can contain further active and auxiliary substances. For example, further active and auxiliary substances, preferably active and auxiliary substances from the group of aesthetic components, in particular active and auxiliary substances from the group of dyes, fragrances, preservatives, enzymes and/or graying inhibitors, can be added to the solvent-surfactant mixture after step a) and before step b).

Alternatively or in addition to this, it is of course also possible for further active and auxiliary substances, preferably active and auxiliary substances from the group of aesthetic components, in particular active and auxiliary substances from the group of dyes, fragrances, preservatives, enzymes and/or graying inhibitors, to be added to the solvent-surfactant mixture during step b) and before step c). Finally, it is also possible to introduce further active and auxiliary substances, preferably active and auxiliary substances from the group of aesthetic components, in particular active and auxiliary substances from the group of dyes, fragrances, preservatives, enzymes and/or graying inhibitors, after steps c) and d).

To physically stabilize the particles in the liquid and to ensure an attractive appearance, the yield point thereof is adjusted to values of 0.1 to 10 Pa in step c), yield points of 0.2 to 5 Pa and in particular 0.5 to 2 Pa having been found to be particularly advantageous. The yield point of the liquid can be measured, for example, using a rotation rheometer from TA Instruments, type HR2 (shear stress-controlled rheometer, cone-plate measuring system with 40/60 mm diameter, 1° cone angle, 20° C.).

To adjust the yield point, at least one organic thickening agent is preferably added to the solvent-surfactant mixture. Preferred solvent-surfactant mixtures therefore contain at least one organic thickening agent after step c).

Preferred organic thickening agents are selected from a) polyacrylate (derivatives), preferably crosslinked polyacrylates;
b) structuring gums, preferably xanthan gum, guar gum, locust bean gum, gellan gum, welan gum or carrageenan;
c) cellulose and cellulose ether derivatives, such as preferably hydroxyethyl cellulose, carboxymethyl cellulose, hydroxypropyl methylcellulose, hydroxypropyl cellulose, ethylhydroxyethyl cellulose;
d) starch, gelatin, polyvinyl alcohols, poly (meth)acrylic acids, polyacrylamides, polyvinylpyrrolidone, polyethylene glycols, agar-agar, pectin, locust bean gum;
e) clay minerals, preferably phyllosilicates, smectites, montmorillonites and hectorites;
f) mixtures of the above.

A first group of particularly preferred organic thickening agents consists of polycarboxylates, preferably homo- and copolymers of acrylic acid, in particular acrylic acid copolymers such as acrylic acid-methacrylic acid copolymers, and polysaccharides, in particular heteropolysaccharides, and other conventional polymer thickeners.

Suitable acrylic acid polymers are, for example, high-molecular-weight homopolymers of acrylic acid (INCI: Carbomer) crosslinked with a polyalkenyl polyether, in particular an allyl ether of sucrose, pentaerythritol or propylene, and also referred to as carboxyvinyl polymers. Polyacrylic acids of this kind are available, inter alia, from BFGoodrich under the trade name Carbopof®.

However, particularly suitable polymers are the following acrylic acid copolymers: (i) copolymers of two or more monomers from the group of acrylic acid, methacrylic acid and their simple esters, preferably formed with $C_{1-4}$ alkanols (INCI: Acrylates Copolymer), which include, for example, the copolymers of methacrylic acid, butyl acrylate and methyl methacrylate (CAS 25035-69-2) or butyl acrylate and methyl methacrylate (CAS 25852-37-3) and which are available, for example, from Rohm & Haas under the trade names Aculyn® and Acusol® and from Degussa (Goldschmidt) under the trade name Tego® Polymer; (ii) crosslinked high-molecular-weight acrylic acid copolymers, which include, for example, the copolymers of $C_{10-30}$ alkyl acrylates crosslinked with an allyl ether of sucrose or pentaerythritol with one or more monomers from the group of acrylic acid, methacrylic acid and their simple esters, preferably formed with $C_{14}$ alkanols (INCI: Acrylates/C10-30 Alkyl Acrylate Crosspolymer) and which are available, for example, from BFGoodrich under the trade name Carbopol®. Suitable acrylic acid esters are also available from BASF under the trade names Skalan® AT 120 and Rheovis® AT 120. If acrylic acid polymers, and in particular acrylic acid esters, are used as polymer thickeners, the pH is preferably more than 7, in particular at least 7.5, preferably 8 or more.

With a use amount of polyacrylate (derivative) of 0.1 to 7.0 wt. %, preferably 0.5 to 5 wt. %, based on the total weight of the solvent-surfactant mixture, very good stability values can be achieved.

A second group of particularly preferred organic thickening agents consists of the structuring gums, with particular emphasis on xanthan gum and gellan gum.

Xanthan gum is a microbial anionic heteropolysaccharide that is produced from *Xanthomonas campestris* and some other species under aerobic conditions and has a molar mass of 2 to 15 million Daltons. Xanthan is formed from a chain with β-1,4-bonded glucose (cellulose) with side chains. The structure of the subgroups consists of glucose, mannose, glucuronic acid, acetate and pyruvate, with the number of pyruvate units determining the viscosity of the xanthan gum. Xanthan gum is available, for example, from Kelco under the trade names Keltrol® and Kelzan® or from Rhodia under the trade name Rhodopol®

Gellan gum is an unbranched, anionic microbial hetero-exopolysaccharide having a tetrasaccharidic basic unit, consisting of the monomers glucose, glucuronic acid and rhamnose. Gellan gum forms thermo-reversible gels after heating and cooling. The gels are stable over a wide temperature and pH range. Gellan gum can be obtained in various qualities from Kelco, for example, under the trade name Kelcogel®

If 0.01 to 4.0 wt. % and preferably 0.1 to 1.5 wt. % of structuring gums, preferably xanthan gum and/or gellan gum, is used, very good stability values are achieved.

The organic thickening agent is added to the solvent-surfactant mixture preferably in liquid form, for example in the form of a solution or a dispersion. This procedure results in a rapid, uniform distribution of the organic thickener in the solvent-surfactant mixture and shortens the incorporation time of the thickener.

Suitable liquid carriers for the organic thickener are a) a solvent-surfactant mixture, for example the solvent-surfactant mixture from step a)
b) a solvent, preferably water, or
c) an alternative liquid carrier, for example a liquid surfactant.

The yield point can be adjusted in step c) in various ways.

In a first preferred embodiment, step c) comprises the steps of:

c1) adding a thickener from the group of synthetic organic polymers to the solvent-surfactant mixture at a pH between 5 and 6;
c2) adjusting the pH of the thickener-containing solvent-surfactant mixture to a value of 6 to 8, preferably 6.6 to 7.

This procedure not only serves to adjust the yield point, but also improves the viscosity of the solvent-surfactant mixture and reduces its turbidity.

In an alternative, second embodiment, the yield point is adjusted in step c) by c1) adding a thickener from the group of synthetic organic polymers to the solvent-surfactant mixture;
c2) mixing the thickener-containing solvent-surfactant mixture by means of a mixing tool, preferably by means of a dynamic mixer.

The yield point is preferably adjusted within a period of 0.01 to 30 seconds, more preferably 0.05 to 20 seconds and in particular 0.1 to 10 seconds. In other words, the duration of method step c) or its substeps c1) and c2) is 0.01 to 30 seconds, preferably 0.05 to 20 seconds and in particular 0.1 to 10 seconds.

Particles are added to the surfactant-containing solvent in step d). These particles can be, for example, abrasive particles or active ingredient particles. The particles are added to the solvent-surfactant mixture in the form of a carrier liquid-particle dispersion. This procedure results in a rapid, uniform distribution of the particles in the solvent-surfactant mixture, shortens the incorporation time of the particles, and reduces the amount of air introduced.

Suitable liquid carriers for the particles are a) solvent-surfactant mixtures, for example the solvent-surfactant mixture from step a)
b) solvents, preferably water, or
c) alternative liquid carriers, for example liquid surfactants.

The particle- and surfactant-containing liquid preferably has a particle concentration of 0.1 to 10 vol. %, more preferably 0.2 to 5 vol. % and in particular 0.3 to 2.0 vol. %.

The particles introduced in step d) preferably have a diameter of 0.1 to 2 mm and in particular 0.5 to 1.5 mm. “Diameter” is understood to mean the maximum diameter of a particle in any spatial direction.

Preferred particles have a specific density of more than 0.1, in particular from 0.1 to 4, preferably from 0.3 to 3 and in particular from 0.5 to 2. This comparatively low specific density facilitates the uniform and stable distribution of the particles in the liquid and thus contributes to an attractive visual appearance of the finished liquid. The specific density, which is also referred to as the relative density, describes the quotient of two densities as a dimensionless size ratio. The specified densities are usually based on the density of pure water under normal conditions at 3.98° C.

Particularly preferred abrasive particles consist of expanded glass, preferably expanded volcanic glass, in particular expanded obsidian, which is referred to as perlite in its expanded form. The Mohs hardness of the abrasive particles is preferably 4 to 6, in particular 5 to 6.

In a particularly preferred embodiment, the abrasive particle consists of pumice, a porous, glassy volcanic rock. It has been found that pumice has very good abrasive properties and, as a natural material, is very environmentally friendly. Due to its high porosity, pumice is also an excellent carrier for fragrances and dyes.

The abrasive particles preferably do not have a round shape. If a particle shape factor is determined, which factor defines the aspect ratio of particles to one another, a value of 1 would stand for a perfectly round shape and a value of 0 would stand for a linear shape. Preferred abrasive particles have a particle shape factor of 0.1 to 0.97, in particular 0.15 to 0.9, more particularly 0.20 to 0.80, preferably 0.3 to 0.70 or 0.60, with values of 0.30 or 0.40 to 0.50 being particularly preferred.

In particular, active ingredient capsules, in particular fragrance capsules, are preferably used as active ingredient particles. Encapsulated active ingredients are particularly susceptible to mechanical stress and the method according to the invention is particularly relevant to them. The fragrance capsules can be water-soluble and/or water-insoluble capsules. For example, melamine-urea-formaldehyde microcapsules, melamine-formaldehyde microcapsules, urea-formaldehyde microcapsules or starch microcapsules can be used.

The particles are added in step d) by continuously introducing these particles, via a secondary line, into the main line carrying the solvent-surfactant mixture. For the homogeneous distribution of the particles and the lowest possible mechanical stress thereon, it has been found to be advantageous for the ratio of the volume flows in the main line and the secondary line to be 0.1:1 to 500:1, preferably 0.5:1 to 200:1, particularly preferably 1:1 to 100:1 and in particular 1:1 to 40:1. For the same reason, it is preferable to select the ratio of the diameters of the main line and the secondary line in a range of 0.1 to 50, preferably 0.5 to 20 and in particular 1 to 10.

While method step b) of the method necessarily follows step a), the sequence of steps c) and d) can be varied. In other words, it is possible either to first adjust the yield point (step c)) and then introduce the particles (step d)) or to first introduce the particles (step d)) and then adjust the yield point (step c)).

A method comprising method steps a) to e) in the following order:

a) providing a solvent-surfactant mixture;
b) continuously passing the solvent-surfactant mixture through a main line;
c) adjusting the yield point of the solvent-surfactant mixture in the main line to 0.1 to 10 Pa;
d) continuously introducing particles having a diameter of 0.1 to 3 mm in the form of a carrier liquid-particle dispersion into the main line via a secondary line;
e) continuously discharging the particle-containing solvent-surfactant mixture from the main line.

A method comprising method steps a) to e) in the following order:

a) providing a solvent-surfactant mixture;
b) continuously passing the solvent-surfactant mixture through a main line;
c) continuously introducing particles having a diameter of 0.1 to 3 mm in the form of a carrier liquid-particle dispersion into the main line via a secondary line;

d) adjusting the yield point of the solvent-surfactant mixture in the main line to 0.1 to 10 Pa;
e) continuously discharging the particle-containing solvent-surfactant mixture from the main line.

Particularly in connection with the above-described multistage procedure for step c), it is preferable, however, for method step d) to follow method step c), since better method results are generally achieved as part of this procedure.

In summary, the following two procedures are particularly preferred:

A method comprising method steps a) to e) in the following order:
a) providing a solvent-surfactant mixture;
b) continuously passing the solvent-surfactant mixture through a main line;
c) adjusting the yield point of the solvent-surfactant mixture in the main line to 0.1 to 10 Pa by means of
  c1) adding a thickener from the group of synthetic organic polymers, in particular a thickener from the group of polyacrylates, to the solvent-surfactant mixture at a pH between 5 and 6;
  c2) adjusting the pH of the thickener-containing solvent-surfactant mixture to a value of 6 to 8, preferably 6.6 to 7.
d) continuously introducing particles having a diameter of 0.1 to 3 mm in the form of a carrier liquid-particle dispersion into the main line via a secondary line;
e) continuously discharging the particle-containing solvent-surfactant mixture from the main line.

A method comprising method steps a) to e) in the following order:
a) providing a solvent-surfactant mixture;
b) continuously passing the solvent-surfactant mixture through a main line;
c) adjusting the yield point of the solvent-surfactant mixture in the main line to 0.1 to 10 Pa by means of
  c1) adding a thickener from the group of synthetic organic polymers, in particular a thickener from the group of structuring gums, to the solvent-surfactant mixture;
  c2) mixing the thickener-containing solvent-surfactant mixture by means of a mixing tool, preferably by means of a dynamic mixer.
d) continuously introducing particles having a diameter of 0.1 to 3 mm in the form of a carrier liquid-particle dispersion into the main line via a secondary line;
e) continuously discharging the particle-containing solvent-surfactant mixture from the main line.

It has also been found to be advantageous for the homogeneous particle distribution and particle loading to adjust the ratio of the particle density of the solvent-surfactant mixture in the main line after step d) to the particle density of the carrier liquid-particle suspension in the secondary line to values of 0.5 to 1.5, preferably 0.6 to 1.4 and in particular 0.8 to 1.3.

"Particle density" refers to the number of particles in a given volume. A particle density of 20 cm-3 designates, for example, a composition which has 20 particles in a volume of 1 $cm^3$.

After step d) and before step e), the particle-containing solvent-surfactant mixture preferably passes through a mixer, preferably a static mixer.

For the resulting particle-containing solvent-surfactant mixture, two viscosity ranges have been found to be particularly advantageous with regard to ongoing pouring, storage and use.

In a first preferred embodiment, when discharged from the main line in step e), the mixture has a viscosity (20° C., Brookfield, Instrument LVDV II+, spindle no. 31, rotation speed 6 rpm) of 2500 to 4500 mPas, in particular 3000 to 4000 mPas.

In a second embodiment, when discharged from the main line in step e), the mixture has a viscosity (20° C., Brookfield, Instrument LVDV II+, spindle no. 3, rotation speed 20 rpm) of 800 to 2000 mPas, in particular 1900 to 1800 mPas.

The visual impression of the particle-containing agent is preferably that of individual, opaque particles stably suspended in a clear liquid. Like the liquid surrounding them, these particles can be of any color, with it being possible for the liquid and the particles to have the same or different colors.

The particle- and surfactant-containing liquid to be poured is advantageously in the form of a hand dishwashing agent, in particular a hand dishwashing agent having a foaming capacity of at least 250 mL, measured according to DIN method 53 902, part 2 (Ross Miles test), preferably at least 300 mL. The foaming behavior of the liquid can be influenced, for example, by its surfactant content.

In summary, the following is provided, inter alia:

1. A method comprising:
   a) providing a solvent-surfactant mixture;
   b) continuously passing the solvent-surfactant mixture through a main line;
   c) adjusting the yield point of the solvent-surfactant mixture in the main line to 0.1 to 10 Pa;
   d) continuously introducing particles having a diameter of 0.01 to 3 mm in the form of a carrier liquid-particle dispersion into the main line via a secondary line;
   e) continuously discharging the particle-containing solvent-surfactant mixture from the main line.
2. The method according to point 1, wherein the solvent-surfactant mixture is provided discontinuously and the solvent-surfactant mixture is introduced continuously into the main line from a buffer container.
3. The method according to point 1, wherein the solvent-surfactant mixture is provided continuously, preferably by introducing surfactant into a solvent flow in the main line.
4. The method according to one of the preceding points, wherein water is used as the solvent.
5. The method according to one of the preceding points, wherein the solvent comprises at least 60 wt. %, preferably at least 80 wt. % and in particular at least 90 wt. % water.
6. The method according to one of the preceding points, wherein the solvent-surfactant mixture comprises 60 to 95 wt. %, preferably 70 to 92 wt. % and in particular 75 to 90 wt. % water.
7. The method according to one of the preceding points, wherein the solvent-surfactant mixture comprises 5 to 35 wt. %, preferably 8 to 30 wt. % and in particular 10 to 25 wt. % surfactant.
8. The method according to one of the preceding points, wherein the surfactant in the solvent-surfactant mixture is selected from the group of anionic and/or amphoteric surfactants.
9. The method according to one of the preceding points, wherein the solvent-surfactant mixture comprises salts of alkyl ether sulfates, alkyl betaines and alkylamine oxides.
10. The method according to one of the preceding points, wherein the solvent-surfactant mixture is transparent.

11. The method according to one of the preceding points, wherein the solvent-surfactant mixture has an air content of 0.1 to 10 vol. %, preferably 0.15 to 5 vol. % and in particular 0.2 to 3 vol. %.
12. The method according to one of the preceding points, wherein further active and auxiliary substances, preferably active and auxiliary substances from the group of aesthetic components, in particular active and auxiliary substances from the group of dyes, fragrances, preservatives, enzymes and/or graying inhibitors, are added to the solvent-surfactant mixture after step a) and before step b).
13. The method according to one of the preceding points, wherein further active and auxiliary substances, preferably active and auxiliary substances from the group of aesthetic components, in particular active and auxiliary substances from the group of dyes, fragrances, preservatives, enzymes and/or graying inhibitors, are added to the solvent-surfactant mixture during step b) and before step c).
14. The method according to one of the preceding points, wherein the yield point is adjusted in step c) to 0.2 to 5 Pa and in particular to 0.5 to 2 Pa.
15. The method according to one of the preceding points, wherein at least one thickening agent, preferably an organic thickening agent, is added to the solvent-surfactant mixture in step c).
16. The method according to one of the preceding points, wherein the yield point is adjusted in step c) by
    a thickener from the group of synthetic organic polymers being added to the solvent-surfactant mixture at a pH between 5 and 6;
    the pH of the thickener-containing solvent-surfactant mixture then being increased to a value of 6 to 8, preferably 6.6 to 7.
17. The method according to one of the preceding points, wherein the yield point is achieved in step c) by
    c1) adding a thickener from the group of synthetic organic polymers to the solvent-surfactant mixture;
    c2) mixing the thickener-containing solvent-surfactant mixture by means of a mixing tool, preferably by means of a dynamic mixer.
18. The method according to one of points 15 to 17, wherein the organic thickening agent is selected from the group of polycarboxylates, preferably crosslinked polycarboxylates.
19. The method according to one of points 15 to 17, wherein the organic thickening agent is selected from the group of structuring gums, preferably from the group of xanthan gum and guar gum.
20. The method according to one of the preceding points, wherein the yield point is adjusted within a period of 0.01 to 30 seconds, preferably 0.05 to 20 seconds and in particular 0.1 to 10 seconds.
21. The method according to one of the preceding points, wherein the particle- and surfactant-containing liquid has a particle concentration of 0.1 to 10 vol. %, preferably 0.2 to 5 vol. % and in particular 0.3 to 2.0 vol. %.
22. The method according to one of the preceding points, wherein the particles in step d) have a diameter of 0.1 to 2 mm and in particular 0.5 to 1.5 mm.
23. The method according to one of the preceding points, wherein the particles have a specific density of more than 0.1, in particular from 0.1 to 4, preferably from 0.3 to 3 and in particular from 0.5 to 2.
24. The method according to one of the preceding points, wherein fragrance capsules are used as particles.
25. The method according to one of the preceding points, wherein the particles have a Mohs hardness of 4 to 6, preferably 5 to 6.
26. The method according to one of the preceding points, wherein the particles consist of expanded glass.
27. The method according to one of the preceding points, wherein the ratio of the volume flows in the main line and the secondary line is 0.1:1 to 500:1, preferably 0.5:1 to 200:1, particularly preferably 1:1 to 100:1 and in particular 1:1 to 40:1.
28. The method according to one of the preceding points, wherein the ratio of the diameters of the main line and the secondary line is 0.1 to 50, preferably 0.5 to 20 and in particular 1 to 10.
29. The method according to one of the preceding points, wherein method steps a) to e) are carried out in the following order:
    a) providing a solvent-surfactant mixture;
    b) continuously passing the solvent-surfactant mixture through a main line;
    c) adjusting the yield point of the solvent-surfactant mixture in the main line to 0.1 to 10 Pa;
    d) continuously introducing particles having a diameter of 0.1 to 3 mm in the form of a carrier liquid-particle dispersion into the main line via a secondary line;
    e) continuously discharging the particle-containing solvent-surfactant mixture from the main line.
30. The method according to one of the preceding points, wherein method steps a) to e) are carried out in the following order:
    a) providing a solvent-surfactant mixture;
    b) continuously passing the solvent-surfactant mixture through a main line;
    c) continuously introducing particles having a diameter of 0.1 to 3 mm in the form of a carrier liquid-particle dispersion into the main line via a secondary line;
    d) adjusting the yield point of the solvent-surfactant mixture in the main line to 0.1 to 10 Pa;
    e) continuously discharging the particle-containing solvent-surfactant mixture from the main line.
31. The method according to one of the preceding points, wherein the ratio of the particle density of the solvent-surfactant mixture in the main line after step d) to the particle density of the carrier liquid-particle dispersion in the secondary line is 0.5 to 1.5, preferably 0.6 to 1.4 and in particular 0.8 to 1.3.
32. The method according to one of the preceding points, wherein the particle-containing solvent-surfactant mixture passes through a mixer, preferably a static mixer, after step d) and before step e).
33. The method according to one of the preceding points, wherein the particle-containing solvent-surfactant mixture in step e) has a viscosity of 2500 to 4500 mPas, preferably 3000 to 4000 mPas.

What is claimed is:

1. A method comprising:

a) providing a continuously produced solvent-surfactant mixture;

b) continuously passing the solvent-surfactant mixture through a main line;

c) adjusting the yield point of the solvent-surfactant mixture in the main line to 0.1 to 10 Pa;

d) continuously introducing particles having a diameter of 0.1 to 3 mm in the form of a carrier liquid-particle dispersion into the main line via a secondary line;

e) continuously adding at least one additional surfactant;

f) continuously discharging the particle-containing solvent-surfactant mixture from the main line.

2. The method according to claim 1, wherein the solvent-surfactant mixture is transparent.

3. The method according to claim 1, wherein the solvent-surfactant mixture has an air content of 0.1 to 10 vol. %.

4. The method according to claim 1, wherein the particle-containing solvent-surfactant mixture has a particle concentration of 0.1 to 10 vol. %.

5. The method according to claim 1, wherein fragrance capsules are used as particles.

6. The method according to claim 1, wherein the particles have a Mohs hardness of 4 to 6.

7. The method according to claim 1, wherein the ratio of the volume flows in the main line and the secondary line is 0.1:1 to 500:1.

8. The method according to claim 1, wherein the ratio of the diameters of the main line and the secondary line is 0.1 to 50.

9. The method according to claim 1, wherein the ratio of the particle density of the solvent-surfactant mixture in the main line after step d) to the particle density of the carrier liquid-particle dispersion in the secondary line is 0.5 to 1.5.

10. The method according to claim 1, wherein the particle-containing solvent-surfactant mixture passes through a mixer after step d) and before step e).

11. The method according to claim 3, wherein the solvent-surfactant mixture has an air content of 0.15 to 5 vol. %.

12. The method according to claim 4, wherein the particle- and surfactant-containing liquid has a particle concentration of 0.2 to 5 vol. %.

13. The method according to claim 4, wherein the particle- and surfactant-containing liquid has a particle concentration of 0.3 to 2.0 vol. %.

14. The method according to claim 7, wherein the ratio of the volume flows in the main line and the secondary line is 0.5:1 to 200:1.

15. The method according to claim 7, wherein the ratio of the volume flows in the main line and the secondary line is 1:1 to 100:1.

16. The method according to claim 7, wherein the ratio of the volume flows in the main line and the secondary line is 1:1 to 40:1.

17. The method according to claim 8, wherein the ratio of the diameters of the main line and the secondary line is 0.5 to 20.

18. The method according to claim 8, wherein the ratio of the diameters of the main line and the secondary line is 1 to 10.

19. The method according to claim 9, wherein the ratio of the particle density of the solvent-surfactant mixture in the main line after step d) to the particle density of the carrier liquid-particle dispersion in the secondary line is 0.6 to 1.4.

* * * * *